United States Patent [19]

Ohsumi

[11] Patent Number: 4,637,954
[45] Date of Patent: Jan. 20, 1987

[54] RESIN-TREATED WOODY MATERIAL

[75] Inventor: Hisayoshi Ohsumi, Hamamatsu, Japan

[73] Assignee: Nippon Gakki Seizo Kabushiki Kaisha, Japan

[21] Appl. No.: 763,470

[22] Filed: Aug. 7, 1985

[30] Foreign Application Priority Data

Aug. 8, 1984 [JP] Japan .................................. 59-166017
Oct. 30, 1984 [JP] Japan .................................. 59-228370

[51] Int. Cl.$^4$ ............................................ B32B 21/04
[52] U.S. Cl. ........................................ 428/342; 427/27;
428/341; 428/537.1; 428/541; 428/542.2;
428/542.6
[58] Field of Search ............... 428/537.1, 542.2, 542.6,
428/541, 342, 341

[56] References Cited

U.S. PATENT DOCUMENTS

| 3,479,197 | 11/1969 | Mork | 427/408 X |
| 3,699,727 | 6/1972 | Raymond | 428/541 |
| 4,169,005 | 9/1979 | Fogle et al. | 156/272 |
| 4,552,792 | 11/1985 | Julian et al. | 428/40 |
| 4,554,959 | 11/1985 | Smedberg | 144/380 |
| 4,587,141 | 5/1986 | Cooley | 428/211 X |

Primary Examiner—Thurman K. Page
Attorney, Agent, or Firm—Ostrolenk, Faber, Gerb & Soffen

[57] ABSTRACT

In production of resin-treated woody material, powdered resin coating on a wooden crude board is combined with subsequent heating under pressure, preferably with use of backings. Concurrent coating and hardening of the resin, and bonding of the backings greatly simplify the process and equipments.

1 Claim, 12 Drawing Figures

RESIN-TREATED WOODY MATERIAL

The present invention relates to resin-treated woody material and method for producing same, and more particularly relates to improvement in production of decorated woody material through application of powdered resin.

In one conventional method for producing such woody material, a crude board such as a decorated board is first subjected to removal of air in a decompression chamber, next to immersion is reactive resin or reactive monomer bath which is liquid under normal or high pressure. After preparatory drying, the board coated or laminated with the resin is subjected to heating under pressure for hardening of the resin.

This conventional method is accompanied with several drawbacks. The production includes a number of operational steps and the equipments used therefor are large and complicated in construction. At resin immersion, the bath has to be filled with resin solution and this manner of resin immersion necessitates consumption of more resin than necessary. In addition, the resin solution is diluted with organic solvent in order to lower the viscocity for easier resin coating. Use of such organic solvent causes rise in production cost and sanitary hazard.

In another conventional method for producing decorated woody material through application of resin, a crude board is coloured after sanding. Next the coloured board is coated with resin solution and subjected to smoothing by sandpaper. The board is again subjected to resin coating followed by smoothing by sand paper and these steps are repeated a couple of times. Finally the resin-coated board is subjected to finish polishing.

This conventional method necessitates sandpaper smoothing and polishing in order to develop surface smoothness. However, a thin board does not allow safe polishing and, as a consequence, the product lacks in surface smoothness. In order to allow safe polishing, the board should have a thick construction which mars flexibility of the material. In addition, uniform resin coating is very difficult to attain for such a thin board.

SUMMARY OF THE INVENTION

It is one object of the present invention to enable production of resin-treated woody material having uniform resin covering with reduced number of operational steps and simple equipments.

It is another object of the present invention to enable production of thin and flexible resin-treated woody material having well developed surface smoothness without waste of materials and sanitary hazard to operators.

In accordance with the first aspect of the present invention, crude board is treated with powdered resin under heat and pressure.

In accordance with the second aspect of the present invention, the first backing is bonded to the back of a crude board, a powdered thermo-setting resin layer is attached to the face of the crude board, and the combination is subjected to heating under pressure.

DESCRIPTION OF THE PREFERRED EMBODIMENTS

Figure 1:
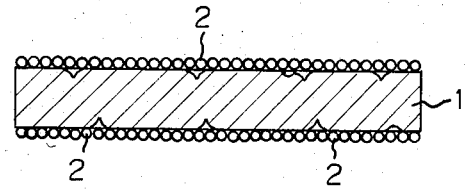
FIGS. 1 through 3 are sectional views for showing the operational steps in one embodiment of the method in accordance with the first aspect of the present invention.

As shown in FIG. 1, a crude board 1 such as a face veneer is used as the starting material. For attaining better flexibility, the crude board 1 should preferably has a thin construction. Typically, the preferable thickness of the crude board 1 is in a range from 0.1 to 0.6 mm. The both sides of the crude board 1 is coated by powdered resin 2.

For the powdered resin 2, thermosetting resins such as epoxy resins, saturated polyester resins, acrylic resins and epoxy polyester resins are usable. The powder diameter should preferably be in a range from 50 to 200 $\mu$m. One preferable powdered resin is a combination of novolak-type epoxy resin and bisphenol-A-type epoxy resin with imidazole such as 2-ethyl-4-methyl-imidazole as a hardener for quick hardening.

For powdered resin coating to the crude board 1, electro-static powder coating or fall-out powder coating is employable. The rate of coating of the powdered resin is dependent on the void percentage, the thickness and the required state of finish of the crude board 1. Normally, the rate of coating is in a range from 10 to 300 g/m$^2$.

Figure 2:
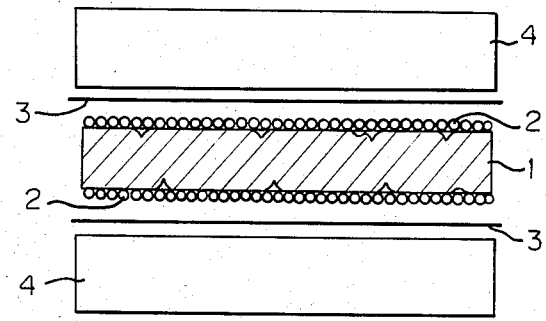

Next as shown in FIG. 2, the crude board 1 coated with the powdered resin 2 is sandwiched by a pair of releasing films 3 and placed between hot-press heads 4 for heating under pressure. Process conditions at heating under pressure are fixed in reference to the kind of the powdered resin 2 and the kind of the crude board 1. When the above-described epoxy resin combination is used, the heating temperature is in a range from 120 to 140° C. and the heating time is in a range from 5 to 30 min. Pressures usually used for lamination at production of laminated boards are usable at this heating under pressure. Heating under pressure promotes melting of the powdered resin 2 which partly permiates into the crude board 1 and partly remains on the faces of the crude board 1. Heat hardens the molten thermo-setting resin.

Figure 3:
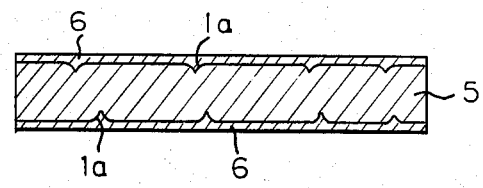

Finally as shown in FIG. 3, the releasing films 3 are removed in order to obtain a resin-treated woody material 5.

The resin-treated woody material 5 is internally fortified by the hardened resin and its surface pores 1a are filled with a resin film 6. When mat or satin films are used, the resin films 6 have delustering texture. When high gloss films are used, the resin films 6 have polishing texture.

Figure 4:
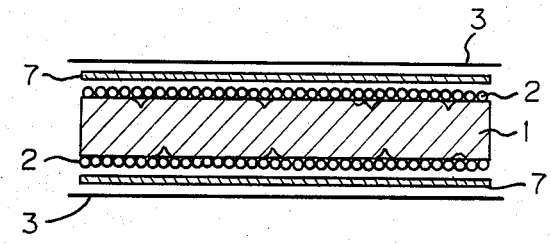
FIGS. 4 and 5 are sectional views of the other embodiments of the method in accordance with the first aspect of the present invention.

In the case of the embodiment shown in FIG. 4, non-woven fabrics 7 are attached to the faces of the crude board 1 coated with the powdered resin 2. The resin permiates into the crude board 1 and the non-woven fabrics 7 and is hardened therein. Thus the crude board 1 and the non-woven fabrics 7 are strongly united together to raise the mechanical strength of the resin-treated woody material 5. When the powdered resin 2 and the non-woven fabrics 7 are close to each other in refraction, presence of the non-woven fabrics 7 in the resin wafers 6 is invisible to maintain the transparency of the resin wafers 6. Thin non-woven fabric is preferably used. Acrylic non-woven fabric of 10 to 100 g/m$^2$ density is preferably used.

Figure 5:
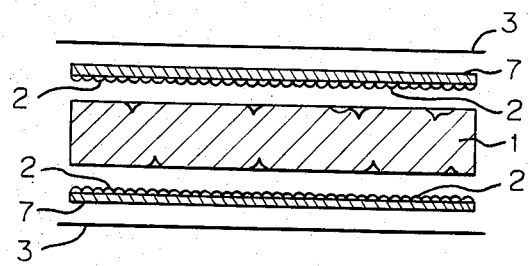

Another embodiment of the method in accordance with the first aspect of the present invention is shown in FIG. 5, in which the non-woven fabrics 7 are advancedly coated with the powdered resin 2 and attached to the crude board 1 for heating under pressure. Advanced coating of the non-woven fabrics assures simpler handling of the materials thereby raising operation efficiency. In an alternative, the releasing films 3 may be advancedly coated with the powdered resin 2. At coating, process conditions should be fixed so that the resin should be thermally meltable even after deposition on the non-woven fabrics 7 or the releasing films 3.

In accordance with the first aspect of the present invention, the process and the equipments are both remarkably simplified since resin coating and hardening can be carried out concurrently during heating under pressure. Superfluous resin powder can be collected for re-use, thereby avoiding waste of materials. Use of no solvent lowers the production cost and avoids sanitary hazard to the operators. The resin-treated woody material produced is provided with beautiful resin film on its faces which allow direct use of the woody material for decorative applications.

Figure 6:
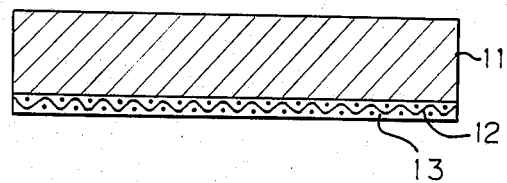
FIGS. 6 through 9 are sectional views for showing the operational steps in one embodiment of the method in accordance with the second aspect of the present invention.

One embodiment of the method in accordance with the second aspect of the present invention is shown in FIGS. 6 through 9, in which a crude board 11 has a thickness preferably in a range from 0.1 to 0.8 mm. The first backing 12 is bonded to the back of the crude board 11 as shown in FIG. 6. The crude boards 11 is preferably made of American wallnut, teak, mahogany, rosewood or oak. The first backing 12 is preferably made of non-woven fabrics, Japanese papers, craft papers or papers impregnated with resin. The first backing 12 fortifies the crude board 11 for easier handling. Thermo-setting adhesive 13 is used for bonding of the two. For example, vinyl acetate emulsion solely or mixed with urea resin is preferably used. The amount of the adhesive 13 to be coated on the first backing 12 is in a range from 50 to 100 g/m$^2$.

After coating with the adhesive 13, the crude board 11 is placed on the first backing 12, and the combination is subjected for slight heating under slight pressure for hardening of the adhesive 13. Thus, the crude board 11 is almost embedded in the adhesive 13 on the first backing 12.

Figure 7:
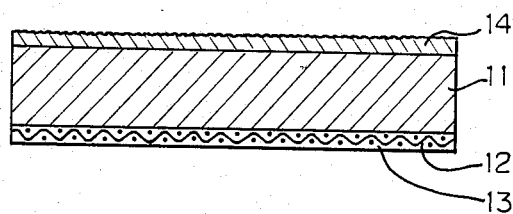

Next as shown in FIG. 7, a thermo-setting resin film 14 is formed on the face of the crude board 11. To this end, mixture of epoxy resin or epoxy polyester resin with hardener is comminuted to obtain powdered resin which is then applied to the face of the crude board 11 by means of electrostatic or fall-out powder coating. Thereafter, melt of the powdered resin is caused by heating by far-infrared radiation. The rate of coating is in a range from 50 to 300 g/m$^2$. In an alternative, a proper substrate may be coated with powdered resin and, after thermal melt, the substrate may be attached to the face of the crude board 11.

Figure 8:
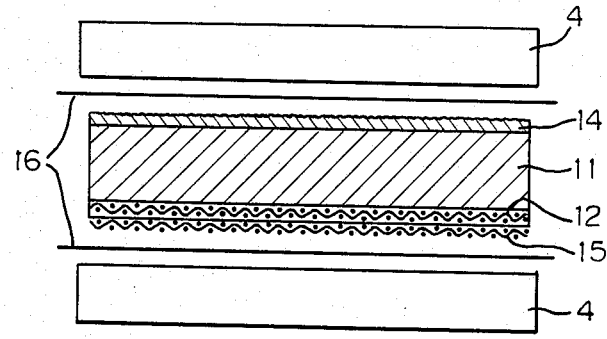

Next as shown in FIG. 8, the second backing 15 is placed on the adhesive 13 on the back of the crude board 11, and the combination is sandwiched by a pair of releasing films 16. Then the combination is subjected to heating under pressure by the hot-press heads 4.

The second backing 15 is used for stronger combination with the base and preferably made of rough surface materials such as non-woven fabrics or nets. The releasing film 16 is made of polypropylene or fluorine resin such as polyvinyl fluoride which is heat-resistant and non-viscous. The thickness of the film 16 is preferably in a range from 15 to 50 μm. When two backings are used as in the instant example, the amount of the first backing 12 is preferably in a range from 10 to 30 g/m$^2$ and that of the second backing 15 is in a range from 10 to 70 g/m$^2$. Preferably, the first backing 12 should be more or less thinner than the second backing 15.

Process conditions at heating under pressure vary depending on the kind of the resin making up the resin film 14 and the kind of the resin contained in the adhesive 13. Heating temperature should be at least equal to or higher than the softening point of the thermoplastic resin contained in the adhesive 13. When epoxy resin is used for the resin film 14 and the adhesive 13 contains vinyl acetate resin, heating should preferably carried out at a temperature from 110° to 150° C., for a time from 7 to 30 min, and under a pressure usually used for production of laminated boards.

Heating under pressure causes thermal melt of the thermo-setting resin in the resin film 14 which thereupon partly fills surface pores in the faces of the crude board 11. The thermoplastic resin in the adhesive 13 on the back of the crude board 11 also melts to firmly bond the second backing 15 to the back of the crude board 11.

Figure 9:
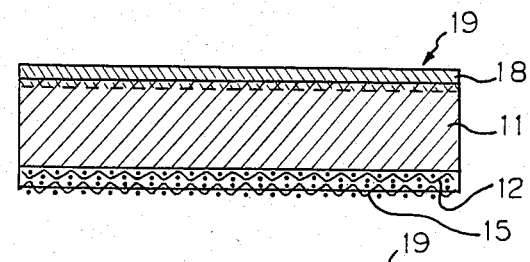

By removing the releasing films 16, a resin-treated woody material 19 such as shown in FIG. 9 is obtained which includes a thin resin film 18 on its face and the backing 15 on the back.

Figure 10:
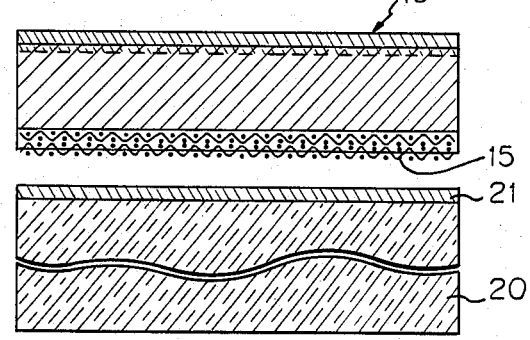
FIGS. 10 and 11 are sectional views for showing production of a laminated board by use of the resin-treated woody material produced in accordance with the present invention.
Figure 11:
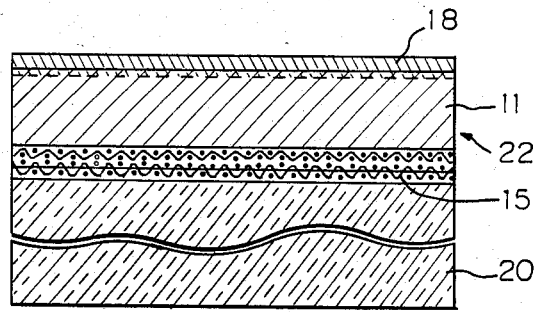

Production of a decorative laminated boards using the above-described resin treated woody material and a laminated board will now be explained in reference to FIGS. 10 and 11. A laminated board 20 may be given in the form of an ordinary lauan board or particle board. One face of the laminated board 20 is coated with adhesive 21 and the woody material 19 is placed thereon as shown in FIG. 10 so that the second backing 15 faces the adhesive 21. Pressure is applied for solidification of the adhesive 21 in order to obtain a decorative laminated board 22 such as shown in FIG. 11.

EVA resins, vinyl acetate resins, mixture of vinyl acetate resin with urea resin, melamine resins are used as major ingredient for the adhesive 21. They may be impregnated in non-woven fabrics or papers which may be attached to the laminated board 20. Bonding should preferably carried out at 100° to 120° C., at 10 to 15×10$^5$ Pa, for 5 to 10 min.

In accordance with the second aspect of the present invention, the process is significantly simplified since formation of the resin film 18 and bonding of the second backing 15 are concurrently carried out on the crude board 11. Presence of the coarse surface texture of the second backing 15 assures film bonding to the laminated board 20, thereby avoiding the need for sanding. The second backing 15 operates as a sort of cushion at heating under pressure to avoid generation of defects such as air voids, inflation and harsh texture. Presence of the uniform resin film 18 on the face of the resin-treated woody material 19 avoid the need for application of finish coating to the decorative laminated board 22.

EXAMPLE 1

Figure 12:
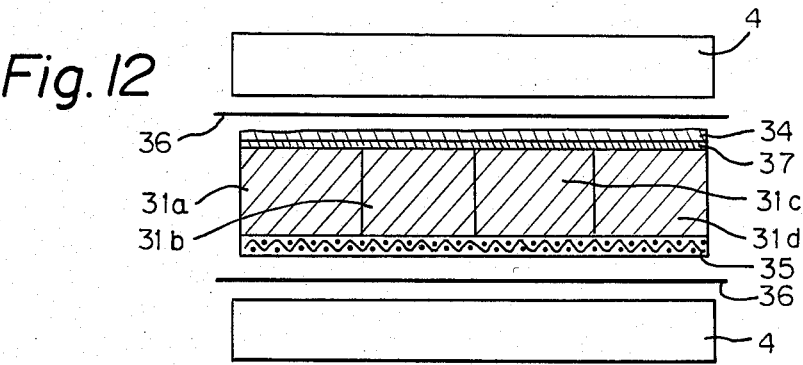
FIG. 12 is a sectional view for showing a resin-treated woody material produced in accordance with the second aspect of the present invention.

One example of the resin-treated woody material in accordance with the second aspect of the present invention is shown in FIG. 12. Production of the resin-treated woody material started with use of crude boards 31a to 31d combined side-by-side. The crude boards 31a to 31d were made of natural woods and have a thickness in a range from 0.1 to 0.6 mm. The front faces of the crude boards 31a to 31d were first painted with a colouring agent 37, and further coated with powdered resin 34. Thermo-setting resin was used for this coating at an amount from 10 to 300 g/m$^2$, and coating was carried out by melt. A backing 35 was attached to the back of the crude boards 31a to 31d at an amount from 10 to 200 g/m$^2$. The combination was then sandwiched by a pair of releasing films 36. The combination was subjected to heating under pressure. The heating temperature was in a range from 100° to 140° C., and more preferably from 120° to 130° C. The pressure was in a range from $2 \times 10^5$ to $20 \times 10^5$ Pa and the heating time was in a range from 5 to 30 min. A beautifully coloured, resin-treated woody material was obtained by a simple process on a simple equipment.

EXAMPLE 2

American wallnut of 0.2 mm thickness was used for the crude board whose back was coated with powered epoxy resin at an amount of about 150 g/m$^2$. The powered resin contained 60 part by weight of novolak type epoxy resin, 40 parts by weight of bisphenol type epoxy resin and 3 parts by weight of 2-ethyl-4-methyl-imidazole as hardner. The powered resin had diameters passable through 100 mesh screen. Next, the combination was placed in a far-infrared furnace at 450° C. (surface temperature) for 20 sec. for melt of the resin. After the resin melt, the combination was sandwiched by polyvinyl fluoride films of 25 μm thickness and subjected to heating under pressure by hot-press heads. The temperature was 130° C. and the heating time was 10 min. The resin-treated woody material so produced was well fortified by the resin component and presence of the surface resin film provided beautiful finish.

EXAMPLE 3

After coating with the powdered epoxy resin in Example 2, an acrylic non-woven fabric was placed on the crude board and, after application of similar releasing films, the combination was subjected to heating under pressure. The bending elasticity of the resin-treated woody material so produced was about 3 times as larger as that of the product in Example 2 and presence of the non-woven fabric in the surface resin film was quite invisible.

EXAMPLE 4

An American wallnut board of 0.2 mm thickness was used for the crude board whose back was covered with a vinylon non-woven fabric at an amount of 30 g/m$^2$. The adhesive contained 100 parts by weight of vinyl acetate resin, 100 parts by weight of urea resin, and 1 part by weight of ammonium chloride. The amount of the adhesive was 100 g/m$^2$. Hardening was carried out at 110° C. temperature and $7 \times 10^5$ Pa pressure. Next, the front face of the crude board was sanded with a sandpaper of No. 240, for colouring with oily paint. Thereafter, powdered epoxy resin was applied by electrostatic powder coating at an amount of 200 g/m$^2$. The powdered resin contained 100 parts by weight of epoxy resin and 3 parts by weight of 2-ethyl-4-methyl-imidazole and had a diameter passable 100 mesh screen. Melting of the resin was carried out in a far-infrared furnace at 450° C. (surface temperature) for 20 sec. A vinylon non-woven fabric of 24 g/m$^2$ density. A pair of matting vinyl fluoride films of 25 μm thickness were used for sandwiching the combination. Heating under pressure was carried out for 10 min. at 130° C. temperature and $10 \times 10^5$ Pa pressure. After cooling down to the room temperature, the pressure was cancelled for removal of the releasing films. A resin-treated woody material so produced was provided with a smooth matting epoxy resin film on the front face and a vinylon non-woven fabric on the back.

A particle board of 20 mm thickness was bonded to this woody material via α-olefin type adhesive by pressing at $7 \times 10^5$ Pa pressure for 60 min in a room temperature emvironment. Bonding between the two were quite reliable and stable.

I claim:

1. Resin-treated woody material comprising
   a crude board of a thickness in a range from 0.1 to 0.6 mm and made of natural wood,
   colorant applied to one face of said crude board,
   a thermo-setting powdered resin applied to said one face of said crude board over said colorant at an amount from 10 to 300 g/m$^2$, and
   a backing applied to the other face of said crude board at an amount from 10 to 200 g/m$^2$.

* * * * *